United States Patent
Zhou

(10) Patent No.: US 10,762,551 B2
(45) Date of Patent: Sep. 1, 2020

(54) INTELLIGENT RECOMMENDATION SYSTEM

(71) Applicant: SAP SE, Walldorf (DE)

(72) Inventor: Keguo Zhou, Shanghai (CN)

(73) Assignee: SAP SE, Walldorf (DE)

( * ) Notice: Subject to any disclaimer, the term of this patent is extended or adjusted under 35 U.S.C. 154(b) by 377 days.

(21) Appl. No.: 15/842,928

(22) Filed: Dec. 15, 2017

(65) Prior Publication Data
US 2019/0188770 A1    Jun. 20, 2019

(51) Int. Cl.
*G06Q 30/06* (2012.01)

(52) U.S. Cl.
CPC .............. *G06Q 30/0631* (2013.01)

(58) Field of Classification Search
CPC ............................. G06G 30/06–08
USPC .................. 705/26.1–27.2
See application file for complete search history.

(56) References Cited

U.S. PATENT DOCUMENTS

| | | | | |
|---|---|---|---|---|
| 8,595,089 B1* | 11/2013 | Roberts | ......... | G06Q 30/0631 705/26.1 |
| 2003/0149612 A1* | 8/2003 | Berghofer | ......... | G06Q 30/02 705/7.29 |
| 2009/0299996 A1* | 12/2009 | Yu | ......... | G06F 16/9535 |
| 2009/0307296 A1* | 12/2009 | Gibbs | ......... | G06Q 30/02 709/201 |
| 2015/0052003 A1* | 2/2015 | Tang | ......... | G06Q 30/0631 705/26.7 |
| 2016/0012088 A1* | 1/2016 | Rossi | ......... | G06Q 30/02 707/736 |
| 2016/0078520 A1* | 3/2016 | Nice | ......... | G06Q 30/0631 705/26.7 |

OTHER PUBLICATIONS

Similarity and Recommender Systems, Hiroshi Shimodaira, Learning and Data Note 2, Jan. 20, 2015 (Year: 2015).*

* cited by examiner

*Primary Examiner* — Ming Shui
(74) *Attorney, Agent, or Firm* — Buckley, Maschoff & Talwalkar LLC

(57) ABSTRACT

An initial matrix is generated through reducing the dimensionality of initial behavior data defined at an initial space. Purchase data associated with objects is evaluated iteratively to determine mappings associating objects with one or more of the subjects. Based on the determined mappings, an object vector matrix is generated based on average measures over subject vectors included in the initial subject matrix. An updated subject vector matrix including updated subject vectors is generated based on the object vector matrix and the purchase data. Updated object vector matrix versions and subject vector matrix versions are iteratively generated based on latest generated version of the matrixes. According to a validation criteria applied over the iterative generation process, a final object vector matrix and a final subject vector matrix are determined. The final determined matrixes may be analyzed to determine recommendations for objects and subjects.

19 Claims, 12 Drawing Sheets

| user_id | locate | birthyear | gender | joinedAt | location | timezone |
|---|---|---|---|---|---|---|
| 3197468391 | id_ID | 1993 | male | 2012-10-02T06:40:55.524Z | Medan Indonesia | 480 |
| 3537982273 | id_ID | 1992 | male | 2012-09-29T18:03:12.111Z | Medan Indonesia | 420 |
| 823183725 | en_US | 1975 | male | 2012-10-06T03:14:07.149Z | Stanford Ontario | -240 |
| 1872223848 | en_US | 1991 | female | 2012-11-04T08:59:43.783Z | Tehran Iran | 210 |
| 3429017717 | id_ID | 1995 | female | 2012-09-10T16:06:53.132Z |  | 420 |
| 627175141 | ka_GE | 1973 | female | 2012-11-01T09:59:17.590Z | Tbilisi Georgia | 240 |
| 2752000443 | id_ID | 1994 | male | 2012-10-03T05:22:17.637Z | Medan Indonesia | 420 |
| 3473687777 | id_ID | 1965 | female | 2012-10-03T12:19:29.975Z | Medan Indonesia | 420 |
| 2966052962 | id_ID | 1979 | male | 2012-10-31T10:11:57.668Z | Medan Indonesia | 420 |
| 264876277 | id_ID | 1988 | female | 2012-10-02T07:28:09.555Z | Medan Indonesia | 420 |

FIG. 4

| | 0 | 1 |
|---|---|---|
| | -1.2233486 | 0.15488416 |
| | -1.1414162 | 0.06412914 |
| | 0.90675027 | -0.7655842 |
| | 0.32622064 | -0.7787212 |
| | -1.1611358 | -0.5942585 |
| | -1.1203541 | 0.15601408 |
| | -1.152547 | -1.0873881 |
| | -0.8219277 | 1.08804225 |
| | -1.2381727 | -1.195241 |
| | -0.1260685 | -0.1328518 |

INTELLIGENT RECOMMENDATION SYSTEM

BACKGROUND

Users of e-commerce platforms leave a lot of information as part of their interactions with the platforms, e.g., in different use cases. When interacting with an e-commerce platform, a user may select products based on defined search criteria and provide customer details in relation to payment and shipment methods. The data may be stored in relation to interactions of purchasing products by customer, and may include data regarding customer (user) characteristics, purchasing records, behavior, etc. Such data may be analyzed to determine purchasing patterns and define recommendations for related products. For example, a customer who likes basketball probably would be interested in buying basketball shoes when browsing an e-commerce platform, and a customer who just bought a pair of basketball shoes would probably want to buy a pair of sports socks.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with their advantages, may be best understood from the following detailed description taken in conjunction with the accompanying drawings.

FIG. 4 is a block diagram illustrating exemplary customer data set, according to one embodiment.

FIG. 5A is a block diagram illustrating an exemplary reduced customer data set based on the customer data set presented at FIG. 4.

FIG. 6 is a block diagram illustrating an exemplary purchase data related to products purchased by a set of customers through an e-commence platform, according to one embodiment.

DETAILED DESCRIPTION

Embodiments of techniques for determining recommendations including products to be provided to customers based on customer data and purchase data are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
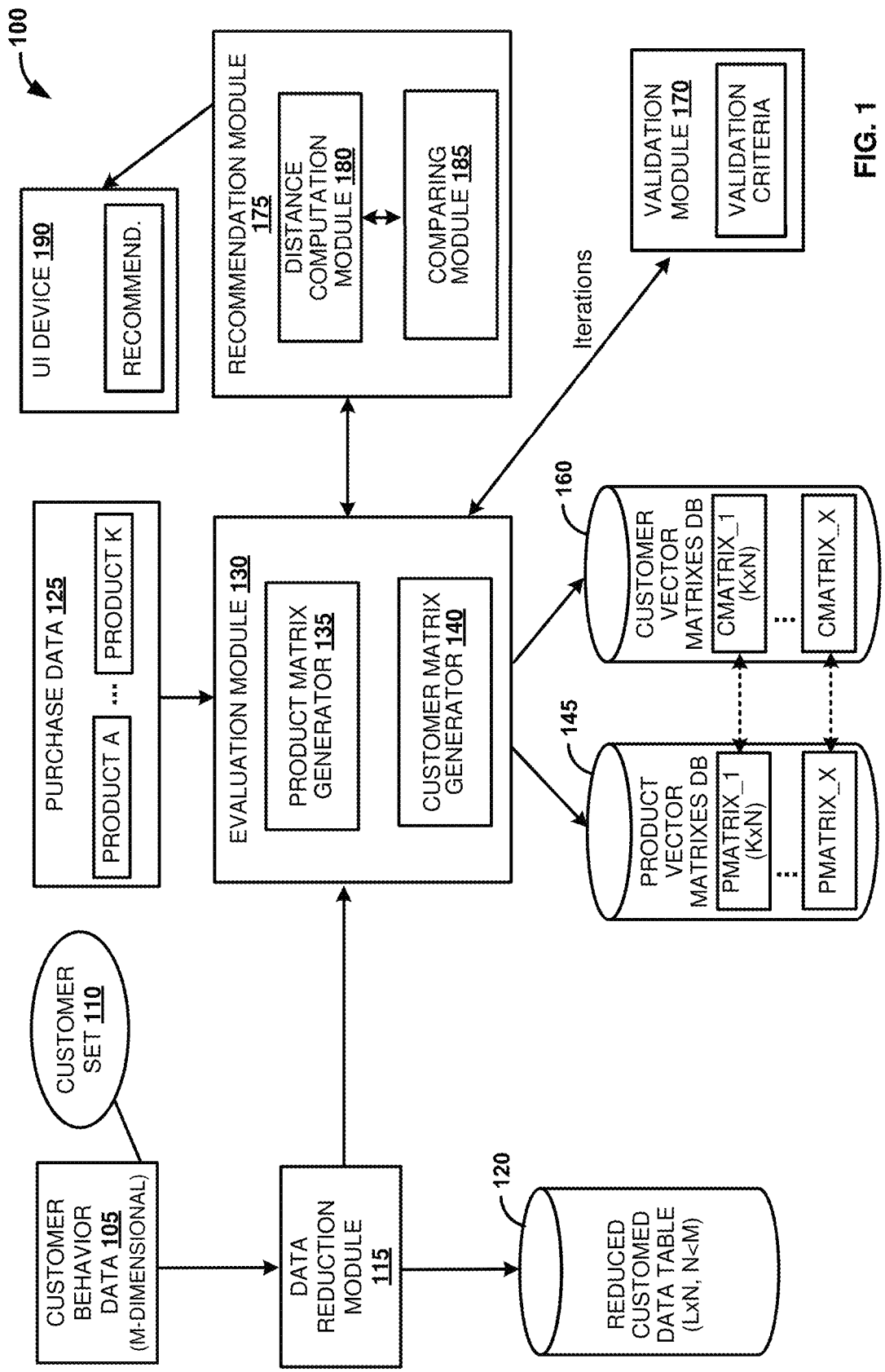
FIG. 1 is a block diagram illustrating an exemplary environment for determining recommendations for products and customers at an online system based on evaluation of customer data and purchase data, according to one embodiment.

FIG. 1 is a block diagram illustrating an exemplary environment 100 for determining recommendations for products and customers at an online system based on evaluation of customer data and purchase data, according to one embodiment.

The customer data is associated with subjects that are identified within data such as the purchase data for purchasing objects (products) identified in the purchase data. Therefore, products identified at purchase data may be denoted as objects, where customers are identified as subjects who purchase the identified objects.

A customer behavior data 105 is provided in relation to a customer set 110. The customer behavior data 105 includes data related to customers (as defined at the set 110), which are registered at an online platform where the online purchases for a number of products may be performed. The online platform may be an e-commerce platform provided as a service, where different product vendors are interacting with registered users during purchasing. The customer behavior data 105 may be stored in a customer matrix denoted by C, which may contain hundreds of columns, such as user identifiers, location, gender, time of placing a purchase, time of registration at the platform, etc. Purchase data 125 represents data stored in relation to purchasing events associated with a set of products. A product from the set is associated with an executed purchase at the online platform associated with a customer from the customer set 110.

In one embodiment, the customer behavior data 105 may include 6 columns, such as the columns presented at FIG. 4—user_id, locale, birthyear, gender, joinedAt, location, timezone. The presented set of customer data at FIG. 4 may be an exemplary subset of the customer data at the customer set 110.

The customer behavior data 105 may be defined in m-dimensional space, and may be stored in a table including m columns. A row of such a table represents a customer data record (vector), where there are m characteristics that are stored for the identified customer.

The customer behavior data 105 may be provided to a data reduction module 115. The customer behavior data 105 may be reduced by decreasing a dimensionality of the data according to a reduction algorithm. For example, the m-dimensional customer behavior data 105 may be reduced to data having 2 dimensions.

In one embodiment, an algorithm for reducing the dimensionality may be utilized. The dimensionality reduction is the process of reducing the number of variables defined for the analyzed data set, such as the customer behavior data 105, by obtaining a set of principal variables (a smaller set of dimensions). For example, the reduction method may be such as a Principal Component Analysis (PCA). Through the PCA method, it is possible to remove redundant dimensions from the customer behavior data 105. PCA maps high-dimension vectors into low-dimension space while keeping them as distinguishable as possible. Therefore, it takes less memory to store the data with minimal information loss.

In some other examples, the algorithm for reducing the dimensionality of the customer behavior data 105 may be such as a Kernal PCA method, a graph-based Kernal PCA, a linear discriminant analysis (LDA) method, a generalized discriminant analysis (GDA) method, other.

The data reduction module 115 may implement a data dimension reduction method to reduce the dimensionality of the received customer behavior data 105 and to generate reduced customer data table 120. For example, the reduced customer data table 120 may include L rows and N columns. The customer behavior data as received include M dimensions, where M is a higher number compared to N, therefore the reducing of dimensions is from M to N. After reducing the dimensionality of the customer behaviors data, a customer matrix with fewer number of columns is generated. For example, FIG. 5A represents an exemplary set of a reduced customer data table generated based on the set of customer behavior data as presented in FIG. 4, according to the PCA algorithm. The relative relationship between customer vectors as defined in the customer behavior data 105 remains within the reduced customer data table 120 as generated based on a reduction algorithm. The reduction algorithm applies a linear mapping over the customer vectors at the customer behavior data.

In one embodiment, an initial customer data matrix including the reduced data as defined at the reduced customer data table 120 is generated. The reduced data includes data for the number of customers as presented in the customer behavior data, and is defined in N dimensions, where N is lower than M. The initial customer data matrix including customer vectors correspondingly identifying the customers in the customer set 110.

An evaluation module 130 is provided, which receives reduced data provided by the data reduction module 115 and purchase data 125. The evaluation module 130 receives the initial customer data matrix as defined based on the reduced customer data table 120 and purchase data in relation to product A to product K. The purchase data for the products may be associated with executed transactions at an e-commerce platform. The purchase data may include a number of rows corresponding to the number of customers defined by the customer set 110 and may include a number of columns corresponding from product A to product K. For example, the purchase data 125 may include data such as the exemplary data presented at FIG. 6. As presented in the example of FIG. 6, customer 1 (first row) has purchased product with id=82.

Based on the implemented logic at a product matrix generator 135 at the evaluation module 130, a product vector matrix is generated including product vectors that are defined for the same space as the space defined for the reduced customer data at the initial customer matrix. For example, as the initial customer matrix is with N dimensions, a first product vector matrix is generated in an n-dimensional space.

The first product vector matrix is generated based on evaluation of the purchase data and determining a correspondence between products and customers, who bought the products. The purchase data includes data regarding executed transactions in relation to purchasing a product by a customer. Therefore, the purchase data is evaluated and a number of mappings are defined between products and customers.

Figure 6:
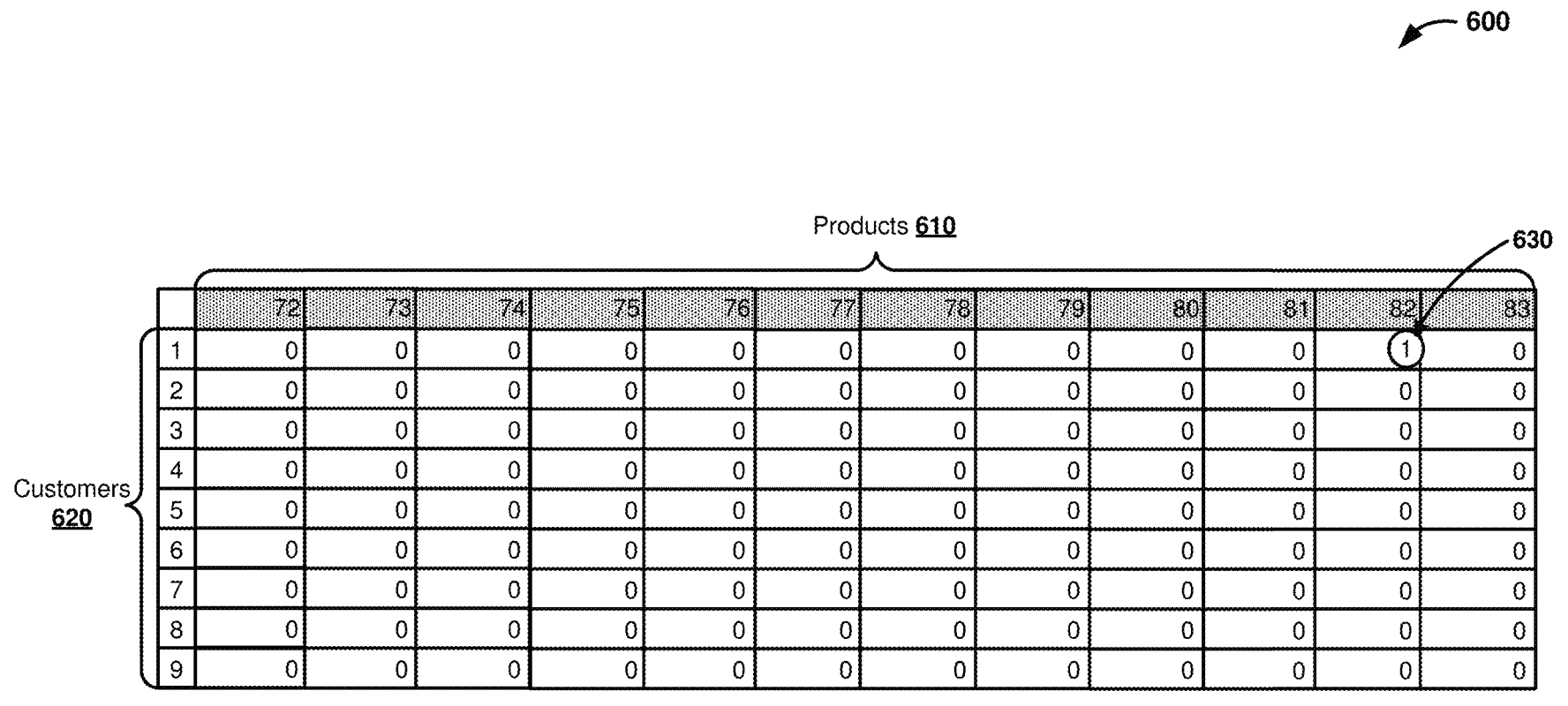

For example, the purchase data may be such as the data presented at FIG. 6. The purchase data may be Boolean data, where a record of 1 stands for a purchased product X by customer Y. Based on analysis of the purchase data at 600, FIG. 6, it may be determined that product No. 82 is to be mapped with the first customer (first row provides information for the purchased activities of the first customer in relation to the defined set of products).

In one embodiment, it may be interpreted that a product may be evaluated in relation to customers who triggered purchases. Therefore, data associated with performed purchases and customer characteristics data may be used in evaluations related to determining recommendations for products to customers, or for associating products with products, or relating customer with customers. Different scenarios may be valid for performing evaluation over data to determine recommendations. Evaluating customer behavior data may facilitate the analysis over products based on product purchase data. For example, evaluating customer behavior data may be utilized for determining recommendations for related products to an analyzed product, and recommendations for the related products may be provided to customers. For example, recommendations may be provided at an online platform for e-commerce. We assume that one product's feature is determined by customers (users at the online platform) why had bought the product.

When the customer vectors are known, product vectors may be calculated based on the customer vectors and the purchase data. For example, the product vectors may be computed according to the following equation (1):

$$p_j = \frac{\sum_i c_i * B_{i,j}}{\sum_i B_{i,j}}$$

This equation can be understood this way: the product vector is the 'average' of its buyer's customer vector. Here we consider 'average' as arithmetic mean.

In one example, the initial customer vectors may be defined based on the reduced customer data as presented in the exemplary table at FIG. 5A, and purchase data associated with products which are bought by the customers may be such as the exemplary purchase data at table 600, FIG. 6. It may be appreciated that the exemplary purchase data presented at table 600 is an exemplary subset utilized for exemplary purposes. The purchase data 600 may be interpreted as part of a larger set of purchase data, where the columns of the purchase data correspond to the number of products defined, and the rows correspond to the number of transactions of buying one or more products. It may be possible that one row from the purchase data is related to defining purchases of more than one products as defined by the columns. This would be the case when one. The initial customer vector matrix is with 2 dimensions and 10 rows (10×2), as defined by the record rows of table 500. Therefore, for the generation of a first product vector matrix, the initial customer vector matrix is used and the purchase data at table 600. The computation of the product vector matrix if performed based on the equation (1) may lead to determining of a number of product vectors corresponding to the number of products defined at the purchase data at table 600. For example, with regards to product 82, it may be determined that product 82 is bought by the first customer, as defined at 630, FIG. 6. Therefore, the product vector corresponding to product 82 is computed based on an average value for the customer vectors corresponding to customers identified to have bought the product at table 600, namely the first customer. The product vector corresponding to product 82 is computed as an average value of the customer vector for the first customer, which is (−1.2233486, 0.15488416), the first record row of the initial customer vector matrix. Analogously, purchase data and the initial customer vector matrix are evaluated and based on equation (1), the product vectors of the first product vector matrix are computed.

In one embodiment, a customer matrix generator 140 is instantiated at the evaluation module 130, which implements logic for regeneration of customer vector matrixes. The customer matrix generator 140 takes the initial customer matrix from the data reduction module 115. The initial customer matrix is defined with L rows and N dimensions (the reduced number of dimensions compared to the initial M dimensions). The customer matrix generator 140, based on the previously generated product vector matrix at the product matrix generator 135 and iterative evaluation of data associated with customers from the purchase data 125, generates an updated customer vector matrix. The updated customer vector matrix includes updated customer vectors. An updated customer vector may be computed based on average measures over product vectors from the latest computed product vector matrix associated with purchased products by the corresponding customer as defined at the purchase data 125.

In one embodiment, the updated customer vector matrix may be computed according to equation (2):

$$c_i = \frac{\sum_j p_j * B_{i,j}}{\sum_j B_{i,j}}. \quad (2)$$

Within the context of the example of a product No. 82 purchased by the first customer, as suggested in the purchase data 600 presented at FIG. 6, the updated customer vector matrix may be generated to include an updated customer vector in relation to the first customer. The purchase data 600 defines that the first customer had purchased product No. 82, therefore, the updated customer vector in relation to the first customer may be defined based on the product vector from the generated product vector matrix, which corresponds to the product No 82. If the product vector matrix is defined in a table format, then the product vector corresponding to product No 82 may be defined at row 82 corresponding to the $82^{nd}$ record of the table.

The customer matrix generator 140 is associated with generating a number of customer vector matrixes, which may be defined iteratively, based on iterative changes in the product vector matrixes as generated iteratively at the product matrix generator 135.

The evaluation module 130 interacts with a data store 145 which includes a product vector matrixes DB 145 and a customer vector matrix DB 160, where iteratively generated product vector matrixes and customer vector matrixes (as generated at the evaluation module 130) are stored.

In one embodiment, at the evaluation module 130, based on a latest generated updated customer vector matrix, a consecutive generated product vector matrix is determined. The consecutively generated product vector matrix may be used to re-evaluate the updated customer vector matrix and therefore, a next version of the updated customer vector matrix may be consecutively re-generated, which is based on the latest consecutively generated product vector matrix and the purchase data Analogously, the latest determined product vector matrix may be re-generated, as there is a next version of the product vector matrix. The updating and regenerating may be performed in an iterative manner. The evaluation module 130 interacts with a validation module 170 which includes a defined validation criteria. The validation module 170 includes logic for evaluation consecutively generated customer vector matrixes and product vector matrixes from the evaluation module 130, to determine whether the iterative process of re-generation of matrixes is to be ended. The iterative cycles of generation of matrixes may be performed until a validation module 170 determines that the latest generated matrixes represent the evaluated customer data and purchase data. The validation module 170 determined whether the latest generated versions of customer vector matrix and product vector matrix meet the validation criteria defined at the validation module 170. The validation module 170 may compute a delta change between consecutive iteratively defined product vector matrix versions and consecutive iteratively defined updated customer vector matrix versions, as receive from the evaluation module 130. The validation criteria at the validation module 170 may include a threshold parameter, where one or more threshold values are associated with rules for evaluation of computed deltas. The computed delta may be compared with a threshold value. When the computed delta is lower than the threshold value, it may be determined that the latest generated product vector matrix and customer vector matrix are the final resulted vectors matrixes. The final result may be provided by the recommendation module 175 to a recommendation module 175 for further evaluation of the data at the final customer vector matrix and the final product vector matrix as provided in the final result.

The final customer vector matrix and the final product vector matrix are provided to the recommendation module 175. A distance computation module 180 is included in the recommendation module to compute distances between vectors defined at the final customer vector matrix and the final product vector matrix. The final matrixes may be used to determine recommendations for products and customers. The distance computation module 180 may compute vector distance measures between a first product vector and a set of other product vectors at the final product vector matrix. Within the purchase data 125, a first product may be associated with the first product vector and the first product may be mapped to a first customer. Therefore, the first product is evaluated in relation to other product based on the product vector distance computations. The computed distances in relation to the first product may be compared at the comparing module 185 to determine a result product vector from the set of other product vectors to be a closest product vector, when a distance between the result product vector and the first product vector is lowest from the vector distances. For example, a determined closest product vector may be provided as a recommendation to a customer who is associated with purchasing the first product.

A recommendation of a product to a customer may be provided to a user interface (UI) device 190. The UI device 190 may be associated with rendering an online shopping platform for facilitating online purchased of products associated with the purchase data 125 offered to customers of the customer set 110. Providing of the recommendations may be based on an analysis logic implemented at the recommendation module 175. The generated final customer vector matrix and final product vector matrix are analyzed at the comparing module 185. The comparing module 185 utilized computed distances between vectors to determine relevant distance computations associated with vectors and perform a comparison.

Figure 2:
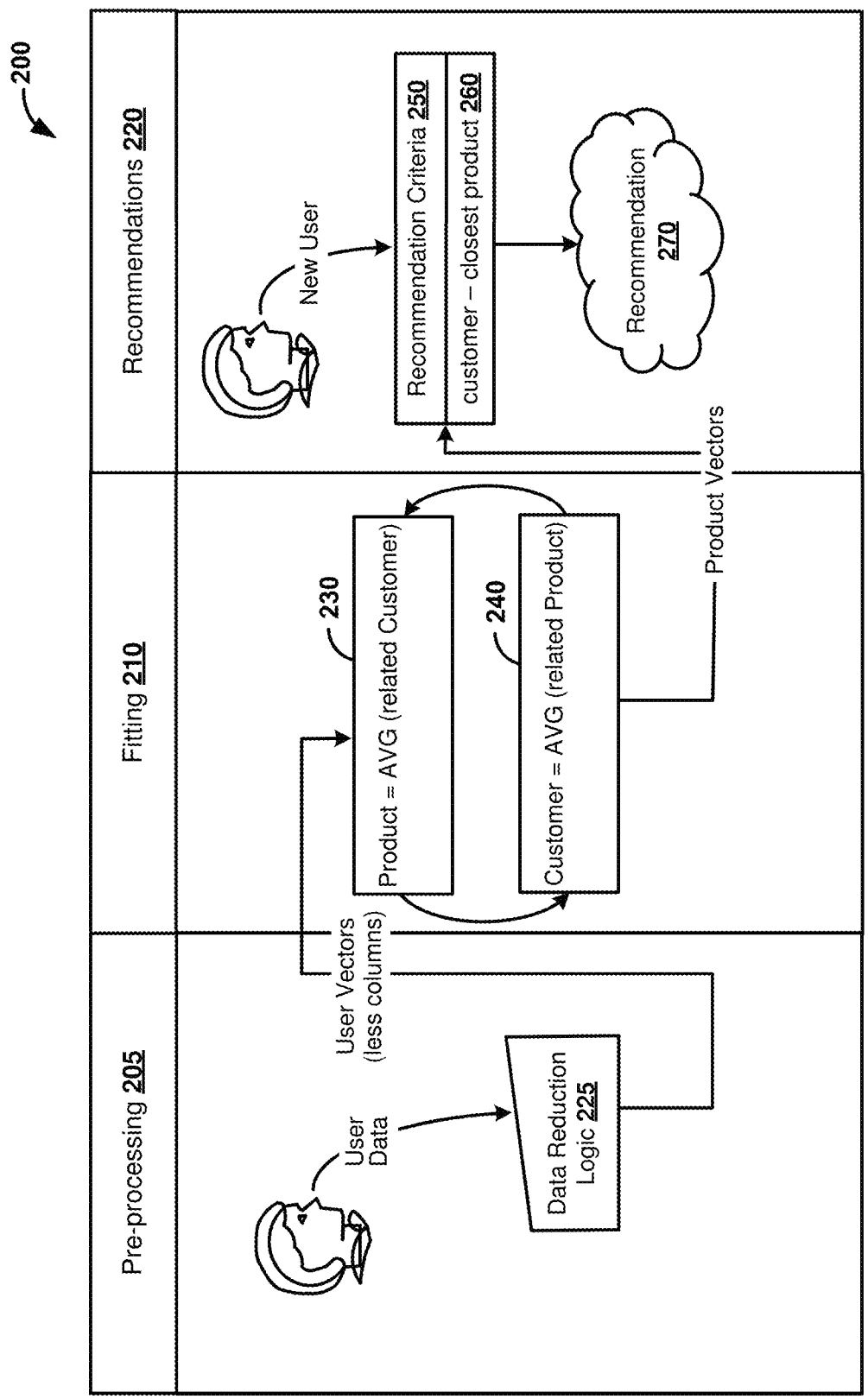
FIG. 2 is a block diagram illustrating a process for determining recommendations including products to be provided to customers based on customer data and purchase data, according to one embodiment.

FIG. 2 is a block diagram illustrating a process 200 for determining recommendations including products to be provided to customers based on customer data and purchase data, according to one embodiment. The process 200 may executed at a system environment such as the described environment 100, FIG. 1. The process 200 include the sub-processes—pre-processing 205, fitting 210, and recommendation 210.

In one embodiment, the pre-processing 205 is associated with received user data. The user data may be data for users registered at a software system, where a user for the system may be interpreted as a customer of products that are offered for purchasing at the software system. The pre-processing 205 includes a data reduction logic 225 that is implemented and executed over the received data, to achieve data at a reduced format. The reduction of the data may be performed based on a reduction algorithm such as the described PCA algorithm in relation to FIG. 1. The data reduction logic 225 may be such as the logic implemented at the data reduction module 115, FIG. 1.

The fitting 210 process is defined as an iterative analysis process, where based on user vectors defined at a lower dimension user space compared to the dimensionality of the initial user data is used as an input. Based on the reduced data in user vectors are purchase data for executed transactions, product vector matrixes and customer data matrixes are generated in iterative cycles. The purchase data may be historic data generated at a software system based on executed transactions in relation to products, being purchased by the customers associated with the user data.

Iteratively, product 230 matrixes and customer 240 matrixes are generated based on the latest available version, the iterative re-generation may be such as the disclosed iterative process described in relation to the implemented logic at the evaluation module 130, FIG. 1. And the process described below in relation to FIG. 2.

The iterative processes at the fitting 210 process provides a final product vectors and final customer vectors as a result. The product vectors may be provided as an input for the recommendation 220 process, where a recommendation criteria 250 is defined. The recommendation criteria 250 may define a threshold distance which may be used while evaluating distance between vectors from the final determined product vectors. Based on evaluation of the product vectors and the customer vectors, recommendations may be provided to existing customer registered at a shopping platform utilizing the recommendation logic. A recommendation 270 may be provided. The recommendation 270 may include an identification of a closest product in relation to a customer, based on evaluation of distances between the vectors defined in the final result provided by the fitting 210 process.

Figure 3:
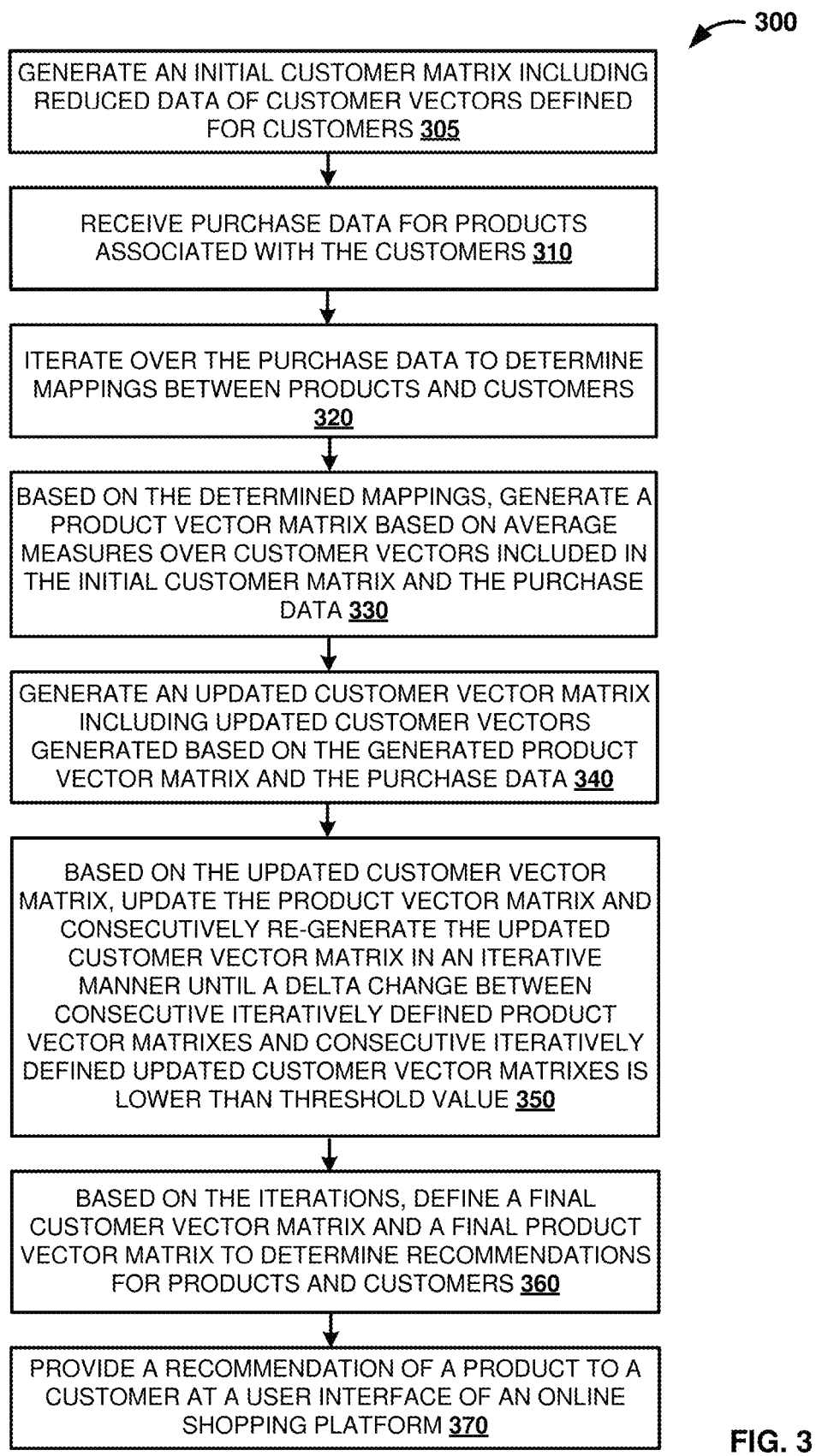
FIG. 3 is a flow diagram illustrating a process for determining recommendations at an intelligent recommendation system, according to one embodiment.

FIG. 3 is a flow diagram illustrating a process 300 for determining recommendations at an intelligent recommendation system, according to one embodiment. The process 300 may be executed at a system environment such as the described environment 100, FIG. 1. Process 300 may be executed in relation to providing recommendations as described in relation to FIG. 1 and FIG. 2. The recommendations may be related to products and customer that are associated with a software system where purchase transactions are executed and purchase and customer data is analyzed. The customer data may be such as the customer behavior data 105, FIG. 1 and the purchase data may be such as the purchase data 125, FIG. 1.

At 305, an initial customer matrix is generated. The initial customer matrix is generated to include reduced data of customer vectors defined for customers in a customer feature data such as the customer behavior data 105, FIG. 1. The customer data that is used for generating the initial customer data may be data with high dimensionality, where the initial customer matrix is generated through a reduction algorithm of the data, where the data at the initial customer matrix is condensed data, where the relatedness between the data rows and data properties is preserved or at least loosely preserved, and the amount of data is reduced.

At 310, purchase data for products associated with the customers are received. The purchase data may define which products are both by which customers. The purchase data provide this definition by identifying the products and customers with unique identification, e.g. by name, or identifier, or some other means.

At 320, the purchase data is iteratively evaluated to determine mappings between customers and products. The iterative evaluation of the purchase data may be performed in the order of the rows defined at the purchase data, where a row corresponds to a customer performed purchase. When a given row is evaluated, it may be determined which customers have bought particular products, and which products have been bought by particular customers. For example, a mapping associates a product of the products as being purchased by a customer from the customers.

For example, the received purchase data at 310, may include data such as the data presented at FIG. 6 and discussed below. Additionally, the initially generated customer matrix may include data such as the presented matrix at FIG. 5A, which is generated based on user data, such as the data included in FIG. 4.

At 330, based on the determined mappings, a product vector matrix is generated based on average measures over customer vectors included in the initial customer data matrix. At 340, an updated customer vector matrix is generated to include updated customer vectors based on the generated product vector matrix and the purchase data.

Table 1 below present an exemplary part of a product vector matrix that may be generated based on an initial customer vector matrix defined in 2 dimensions.

TABLE 1

| | |
|---|---|
| −0.9155209 | 0.02633596 |
| 0.92321011 | 0.11216989 |
| −0.59975909 | 0.08576077 |
| −0.93083935 | 0.02766069 |
| −0.40111175 | 0.06463347 |
| −0.93083935 | 0.09104259 |

TABLE 1-continued

| | |
|---|---|
| 0.92321011 | 0.15442449 |
| 0.92321011 | 0.09421169 |
| ... | ... |

Based on such an exemplary product vector matrix, and purchase data evaluation, the updated customer vector matrix is generated. The updated customer vector matrix may include data such as the data presented at Table 2 below.

TABLE 2

| | |
|---|---|
| −0.93083935 | −0.07797581 |
| −0.93083935 | −0.20473962 |
| 0.77104019 | 0.07302217 |
| −0.93083935 | −0.12023042 |
| −0.93083935 | 0.06991529 |
| −0.53354304 | 0.09104259 |
| 0.92321011 | 0.05583042 |
| −0.93083935 | 0.11216989 |
| ... | ... |

At 350, based on the updated customer vector matrix, the product vector matrix is updated and the updated customer vector matrix is consecutively re-generated. The updating and regenerating is performed in an iterative manner. Within the iterative generation of new versions of the updated customer vector matrix and the product vector matrix, a set of consequent versions of the product vector matrix and a set of consequently generated versions of the updated customer vector matrix are computed. The iterative generation starts with the product vector matrix and the updated customer vector matrix as an input. Generation of a consequent version of the product vector matrix from the set is based on a previously generated version of the customer vector matrix from the setThe iterative cycles of generation of matrixes are performed until a delta change between consecutive iteratively defined product vector matrices and consecutive iteratively defined updated customer vector matrixes is lower than a threshold value.

At 360, based on the iterations at 350, a final customer vector matrix and a final product vector matrix are defined. The final matrixes may be used to determine recommendations for products and customers.

At 370, a recommendation of a product to a customer at a user interface of an online shopping platform is provided. The recommendation may be such as the disclosed recommendations in relation to FIG. 1 and FIG. 2. For example, the recommendation may be such as the recommendation provided by the recommendation module 175 at the UI device 190. The providing of the recommendation may be based on an analysis logic implemented at a recommendation system. The generated final customer vector matrix and final product vector matrix are analyzed, relevant distance computations between vectors are performed, and comparison is made to define recommendations.

In one embodiment, it may be determined that the exemplary product vector matrix and updated customer vector matrix as presented at Table 1 and Table 2, are the final customer vector matrix and final product vector matrix, which may be used to determine recommendations. For example, for a final customer vector as presented at Table 3, we may find 6 closest product vectors as presented in Table 4:

TABLE 3

| Dim1 | Dim2 |
|---|---|
| −0.79438941 | 0.08000663 |

TABLE 4

| Dim1 | Dim2 | Distance to the customer vector |
|---|---|---|
| −0.79438941 | 0.08000663 | 0 |
| −0.79522423 | 0.07998041 | 0.000835232 |
| −0.79599433 | 0.07950666 | 0.001680993 |
| −0.79623638 | 0.07971905 | 0.001869225 |
| −0.79656528 | 0.07931113 | 0.002284323 |
| −0.79750561 | 0.07973792 | 0.003127764 |
| ... | ... | ... |

A row from Table 4 represents a transferred vector of a product. The Euclidean distance is defined according to the following equation: $d(x, y) = \sqrt{\sum_{i=1}^{k}(x_i^2 - y_i^2)}$, where k indicates the dimension of vectors. To get the k closest neighbors, we compute distances between a customer and a product vector from all of the product vectors and find the top-K closest vectors. These products are most likely to be accepted by this customer, based on evaluation of the data presented at the final matrixes.

FIG. 4 is a block diagram illustrating exemplary customer data set 400, according to one embodiment. The customer data set 400 is an exemplary set of customer feature data, such as the customer behavior data 105. The customer data set may be generated at an online system running on a cloud platform, where the online system is running to facilitate the execution of purchase transactions by a number of customer in relation to products provided for sale by different product vendors. The data set 400 defines six columns—user_id, locale, birthyear, gender, joinedAt, location, timezone. A customer from the customer data set 400 is identified based on the user_id 420 column, and feature data in relation to the customer is defined in the column set 410, including the properties locale, birthyear, gender, joinedAt, location, timezone. A first customer of the platform is defined at row 430, which is identified by user_id=3197468391.

FIG. 5A is a block diagram illustrating an exemplary reduced customer data set 500 based on the customer data set presented at FIG. 4. The data set 500 is generated based on a reduction algorithm such as the PCA algorithm. The data set 500 is generated based on reducing the six-dimensional data at set 400 into two-dimensional data having "dimension 1" 520 and "dimension 0" 510. The first row 530 of the table including the data set 500 is computed to be associated with the first customer as identified at 430 at FIG. 4.

Figure 5B:
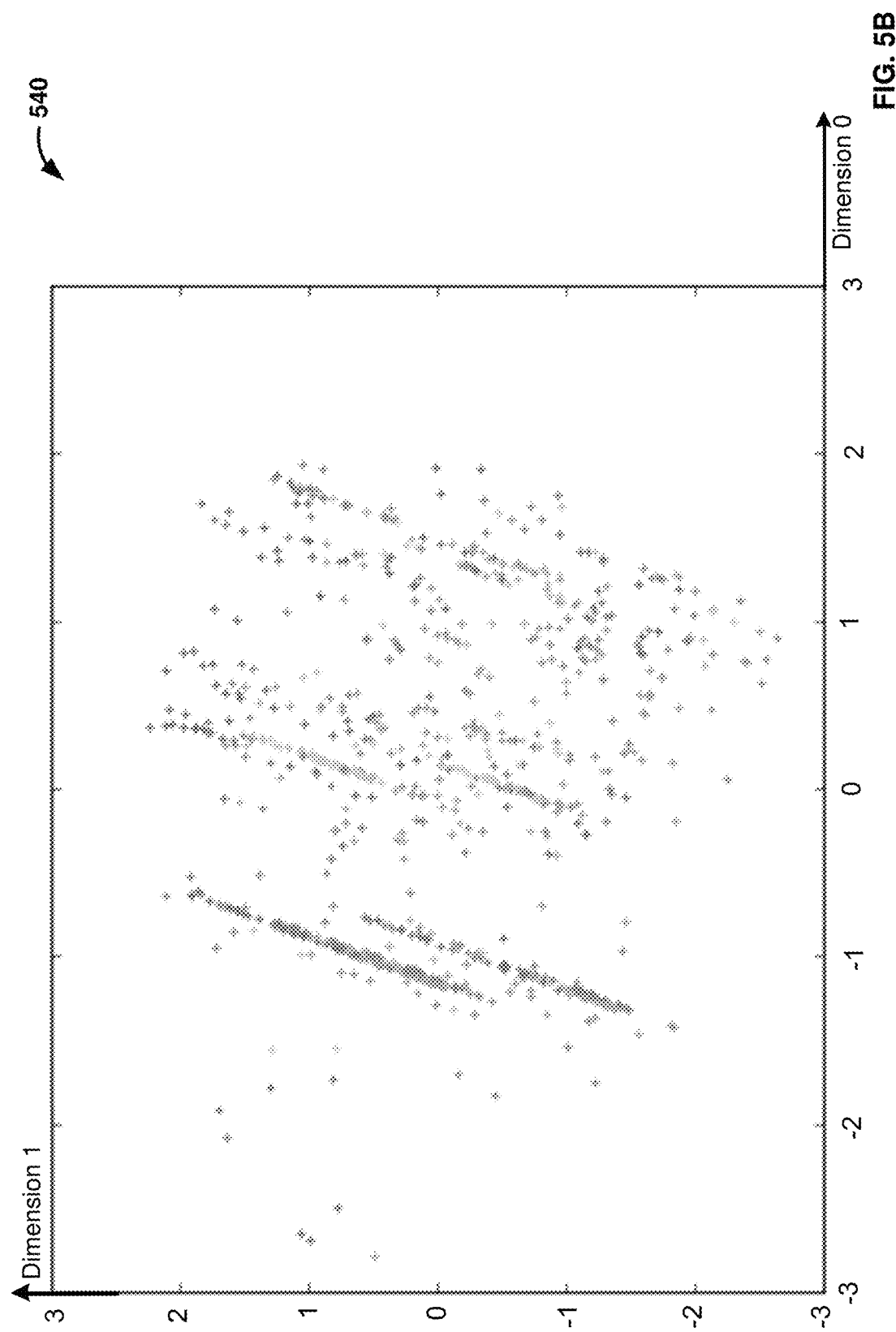
FIG. 5B is a block diagram illustrating a graphical representation of an initial customer vector matrix in a two-dimensional space, according to one embodiment.

FIG. 5B is a block diagram illustrating a graphical representation 540 of an initial customer vector matrix in a two-dimensional space, according to one embodiment. The graphical representation 540 is generated based on reduced customer behavior data into a two-dimensional data, having dimension 1 and dimension 2, such as the exemplary reduced data presented at FIG. 5A.

FIG. 6 is a block diagram illustrating an exemplary purchase data 600 related to products purchased by a set of customers through an e-commerce platform, according to one embodiment. The purchase data 600 is stored at a table and is related to a set of products 610 and a set of customers 620. In the table, the products 610 are defined as columns, and customers 620 are defined as rows. The purchase data may be associated with executed translations at an e-commerce platform in relation to purchased products by customers. The purchase data may include a number of rows corresponding to the number of customers and may include a number of columns corresponding the different products (e.g. identified by a product number). For example, the purchase data 125 may include data such as the exemplary data presented at FIG. 6. As presented in the example of FIG. 6, customer 1 630 (first row) has purchased product with id=82.

Figure 7:
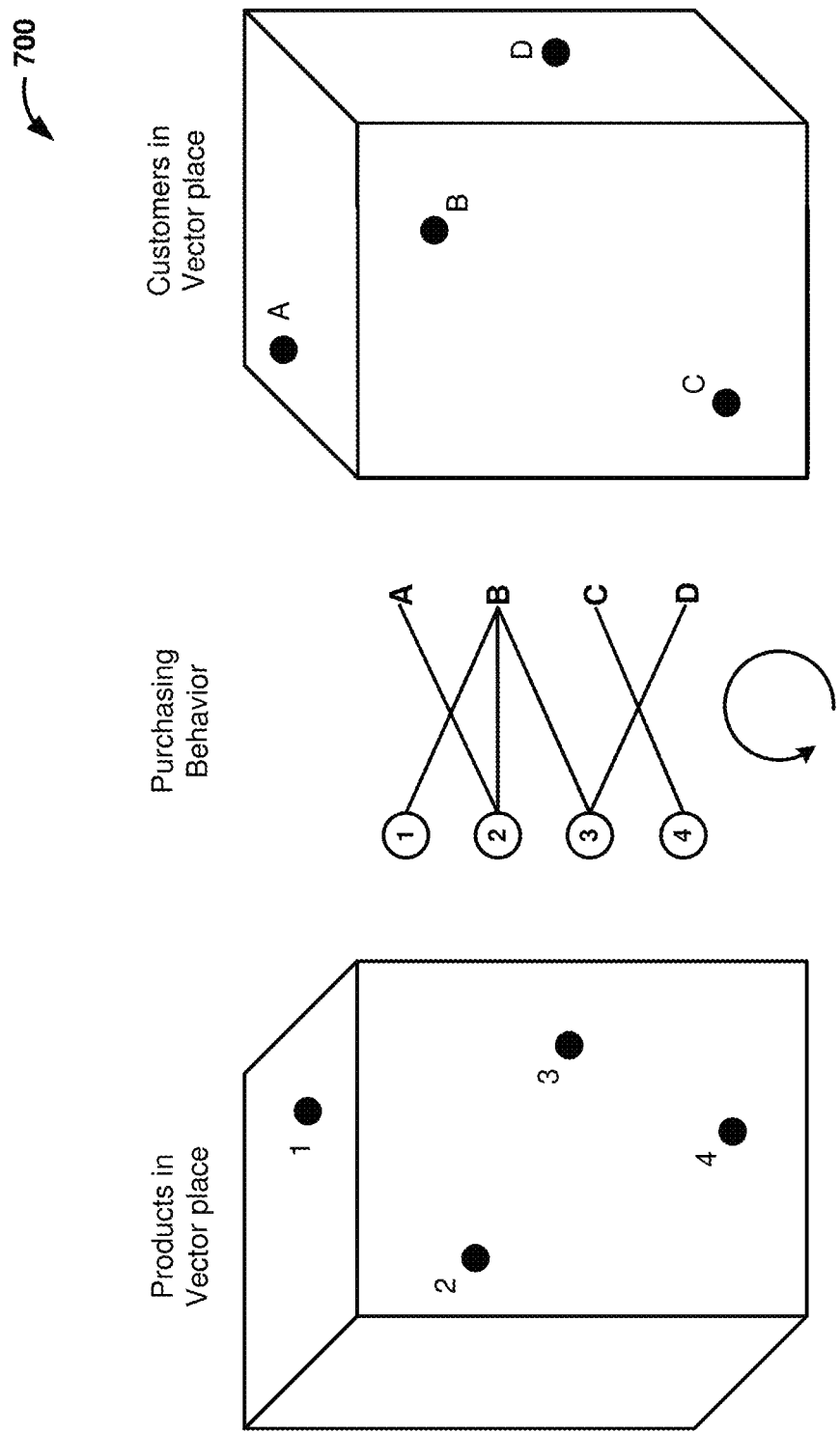
FIG. 7 is a block diagram illustrating exemplary iterative process of evaluating customer vector matrixes and product vector matrixes, according to one embodiment.

FIG. 7 is a block diagram illustrating exemplary iterative process 700 of evaluating customer vector matrixes and product vector matrixes, according to one embodiment. An iterative algorithm is provided to define a data model that represents customer and product at one high-dimension vector space. These vectors (both customer and product) are defined in the same linear space. The vectors may be generated according to described techniques discussed in relation to figures above. Relativity between vectors and respectively corresponding products and customer may be quantified through calculation of vector differences, for example through calculating the Euclidian distance between vectors. The proposed iterative method of determining final matrixes for products and customer may fully utilize the stored customer feature data and purchasing behavior data to verify the validity of a generated meta model based on the history data.

In one embodiment, as an initial step, customer vectors from customer feature data are initialized. The initialization may be performed with reduced data, as discussed in relation to FIG. 1 and FIG. 2. Product vectors are generated according to the initialized customer vectors and purchasing behavior data. The customer vectors from the initial set are updated according to the generated product vectors and the purchasing behavior data. The generation of product vectors and customer vectors is repeated in cycles of iterations, where a previously generated vector matrix is used for computations related for the generation of a consecutive vector matrix. The repetition of regenerations of product and customer matrixes is performed until a change of the vectors after one iteration is less than a defined value for a threshold parameter.

It may be assumed that one product's feature is determined by customers why buy it. So, this assumption may be applied when analysis is performed over data stored in relation to the relevant products and customers at the vector matrixes. For example, if the customer vectors are known, one may calculate product vectors with the equation (1):

$$p_j = \frac{\sum_i c_i * B_{i,j}}{\sum_i B_{i,j}} \quad (1)$$

The equation defines that a product vector is the 'average' of its customer vectors associated with customers who are identified in the purchase data as having bought the product. The average measure may be defined as arithmetic mean.

Once customer vectors are initialized from the original feature data, and product vectors are generated, it may also be understood that what products one customer buys can also determine the customer's location in the vector space. So as the product vectors are known, one may calculate customer vectors following equation (2):

$$c_i = \frac{\sum_j p_j * B_{i,j}}{\sum_j B_{i,j}} \quad (2)$$

Based on the updated customer vectors, the product vectors may also be regenerated as instead of using the initial customer vectors from the initial customer matrix, the latest availably generated customer vector matrix may be used for refining the computations.

In one embodiment, the process of regeneration of a product vector matrix and a sequential customer vector matrix may be repeated iteratively until the 'change' of vectors after one iteration is less than a threshold.

The change of vectors after one iteration may be defined as d and computed according to formula (3):

$$d = \frac{\sum_i (c_i - \hat{c}_i)^2 + \sum_j (p_j - \hat{p}_j)^2}{N} \quad (3)$$

where N is the total number of product vectors and customer vectors, $\hat{c}_i$ is the updated customer vector of customer i, $\hat{p}_j$ is the updated product vector of product j, $c_i$ and $p_j$ are customer vector and product vector before update.

When it is determined that d<ϵ, the iterations may be stopped and the latest $c_i$ and $p_j$ are defined as final result. The ϵ represents a threshold, which is associated with the accuracy and running time of the computations during the iterative process. The smaller the value of ϵ, the higher the accuracy and the longer the running time for computations. In one embodiment, the value of ϵ may be set to 0.0001, where 0.0001 is associated with a relatively high accuracy and short running time.

Based on changing the computations in each step in the equations above in relation to of $c_i$ and $p_j$, or the definition of d, differences may occur, which may be based on pruning the data model as a result of the iterations and the fitting to the historic data.

The final result of product vectors and customer vectors in the same linear space may be utilized in an e-commerce intelligent recommendation system. For example, a product whose vector has least Euclidean distance from a customer's vector and a product whose vector has least Euclidean distance from the product vector of what the customer had recently purchase may be determined based on evaluation of the final result vectors.

Figure 8A:
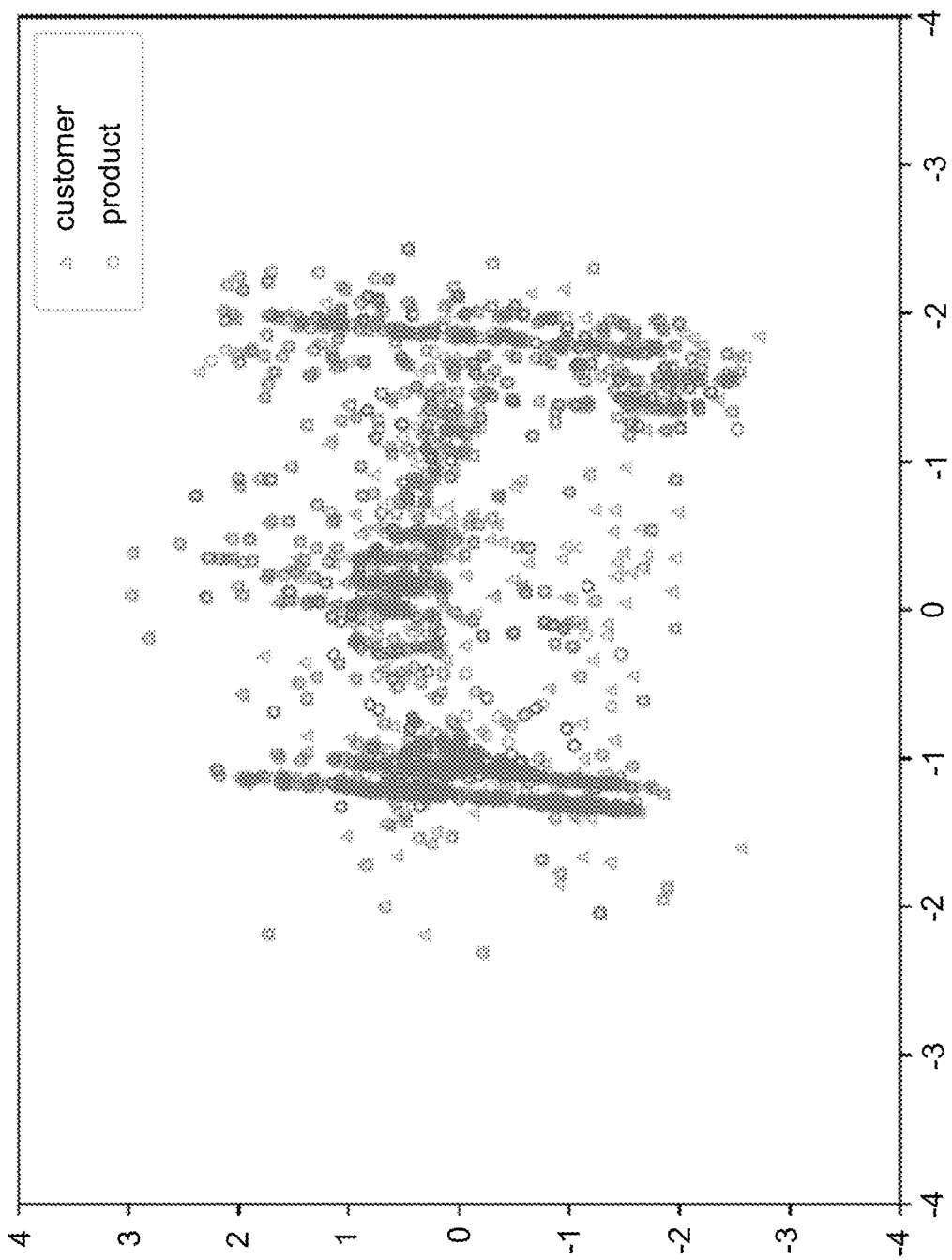
FIG. 8A is a block diagram illustrating a graphical representation of product vectors and customer vectors at a two-dimensional user space, according to one embodiment.

FIG. 8A is a block diagram illustrating a graphical representation 800 of product vectors and customer vectors at a two-dimensional user space, according to one embodiment. The graphical representation 800 is generated based on a finally defined customer vector matrix and a defined product vector matrix based on an iterative evaluation process of customer and purchase data, as discussed in relation to FIG. 1, FIG. 2, FIG. 3, FIG. 7, other. The graphical representation 800 includes plotted customer vector and plotted product vectors to facilitate interpretation of relationships between a number of customers from the whole set of customers and between a number of products from the set of products.

Figure 8B:
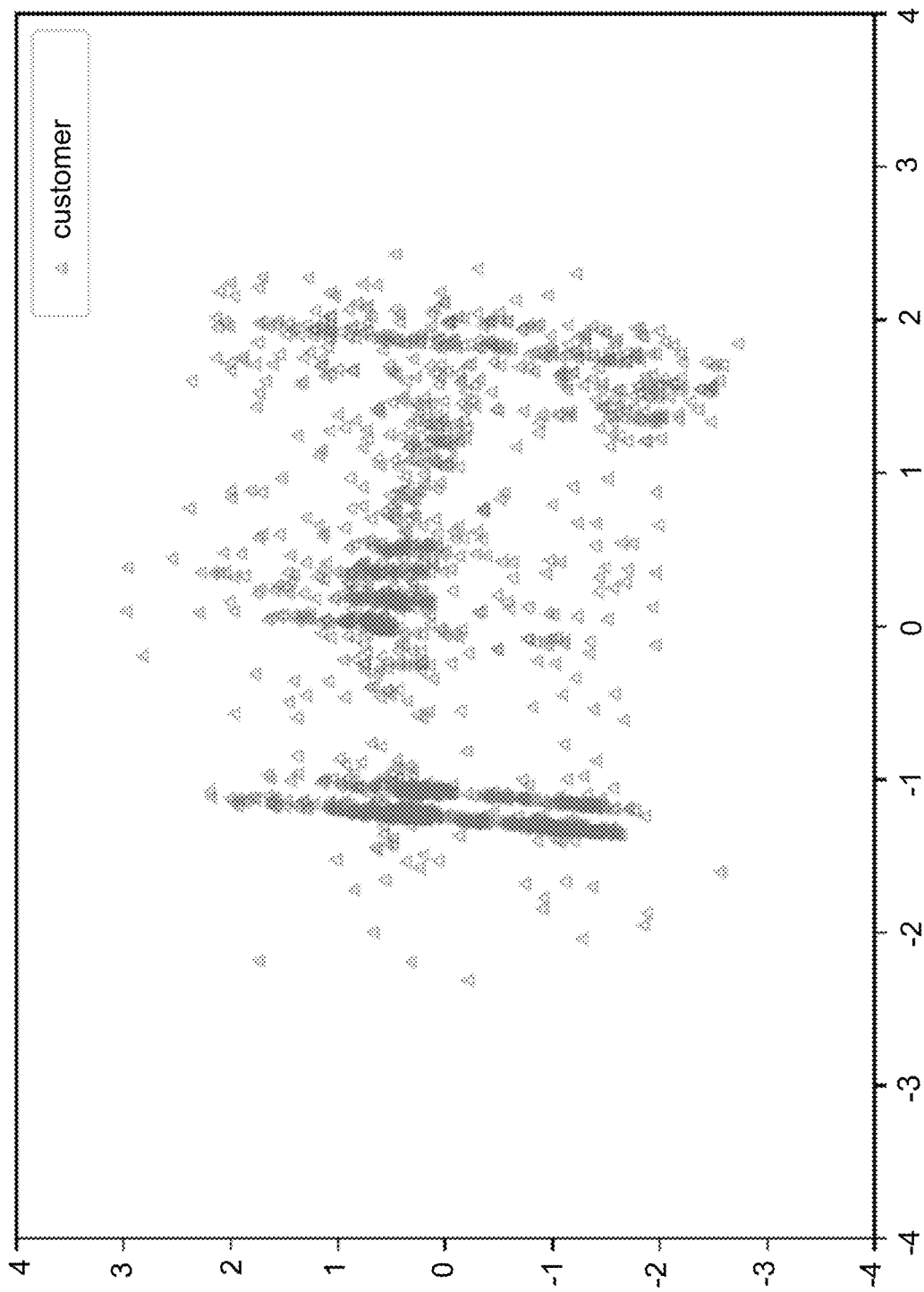
FIG. 8B is a block diagram illustrating a graphical representation of customer vectors at a two-dimensional user space, according to one embodiment.

FIG. 8B is a block diagram illustrating a graphical representation of customer vectors at a two-dimensional user space, according to one embodiment. The customer vectors presented at FIG. 8B are the customer vectors plotted on FIG. 8A.

Figure 8C:
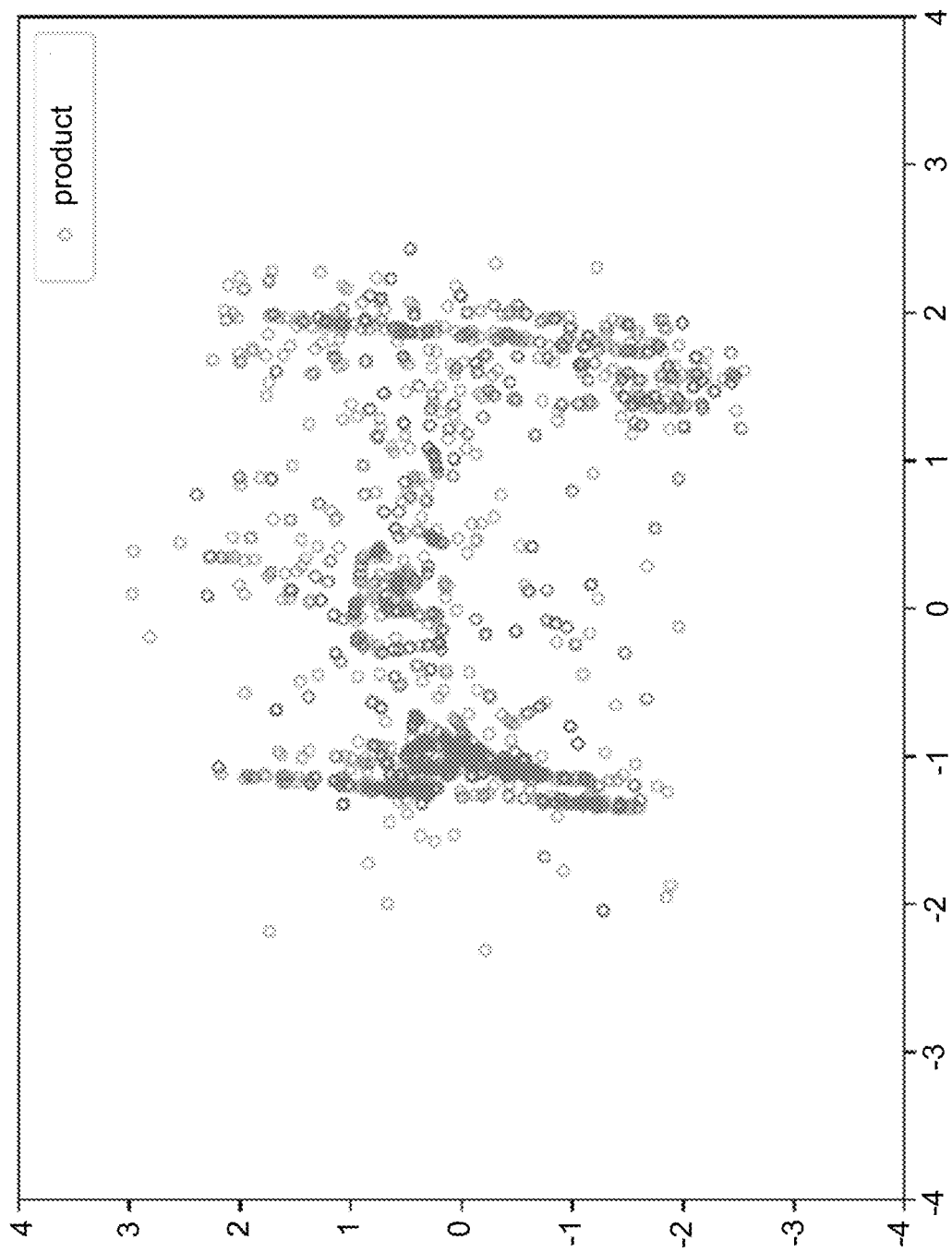
FIG. 8C is a block diagram illustrating a graphical representation of product vectors at a two-dimensional user space, according to one embodiment.

FIG. 8C is a block diagram illustrating a graphical representation of product vectors at a two-dimensional user space, according to one embodiment. The customer vectors presented at FIG. 8C are the customer vectors plotted on FIG. 8A.

The determination of relationships may be performed based on evaluation of distances computed between the plotted vectors. The graphical representation 800 may be provided on a user device including a graphical user interface (GUI). The visual representation of the determined vectors may be used for visual analyzes of the data and determining relativity between vectors.

In one embodiment, a recommendation may be determined based on evaluation of products that are related to a product, which is recorded in the purchase data as being purchased by a customer X. Therefore, relativity between the product and other products from the set of products may be quantified by computing distances between vectors. For example, the calculation of distances may be based on Euclid distance measure.

Further utilization of the generated and plotted matrixes data may be performed within a recommendation platform. For example, a customer may be recommended with the closest products based on evaluation of the generated and presented matrixes data. The closeness can be easily defined as distance between any product vector and customer vector. Likewise, one may analysis how are customers clustered and whether there are particular features of a cluster. The determination of clusters may be performed through graphical analysis of the plotted matrixes as presented on the graphical representation 800. For example, clustering analysis may be performed over the graphical representation 800, where comparison sets of plotted vectors may be performed to determine tightness and separation of the graphical presented vectors and sets of vectors. Data analysis and clustering techniques may be executed and evaluation result for the customers and products may be provided for further analysis.

During the recommendation process, the relativity between products and products, products and customers, and customers and customers, may be determined based on evaluation logic that is executed over the computed final customer and product vector matrixes. Therefore, the computed matrixes may serve as a data model that may be embedded into a recommendation engine, where calculations or relativity between customers, products, and customers and products are performed more precisely and accurately.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 9:
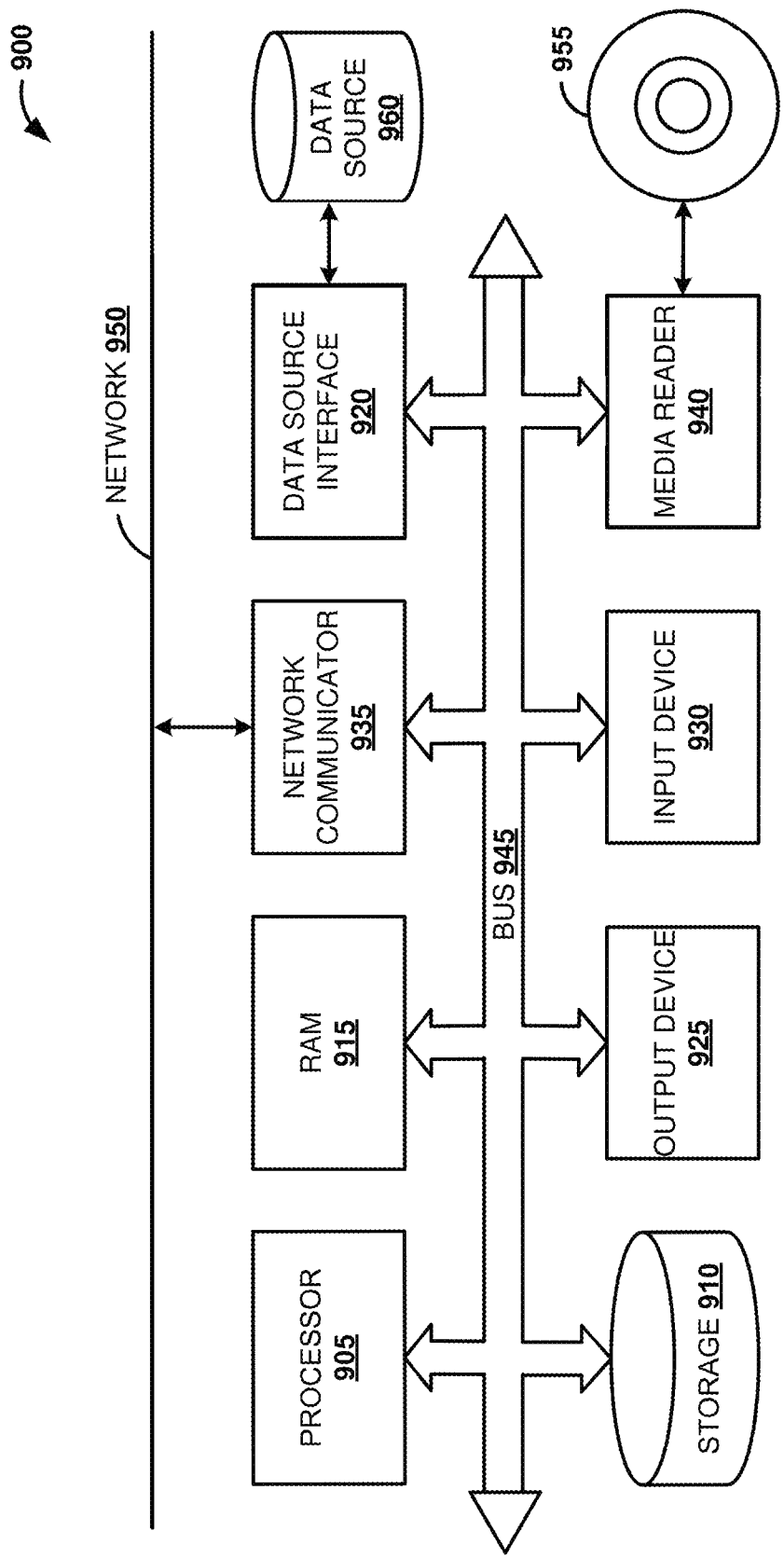
FIG. 9 is a block diagram illustrating an embodiment of a computing environment in which the techniques described for determining recommendations through an intelligent recommendation system, can be implemented.

FIG. 9 is a block diagram of an exemplary computer system 900. The computer system 900 includes a processor 905 that executes software instructions or code stored on a computer readable storage medium 955 to perform the above-illustrated methods. The processor 905 can include a plurality of cores. The computer system 900 includes a media reader 940 to read the instructions from the computer readable storage medium 955 and store the instructions in storage 910 or in random access memory (RAM) 915. The storage 910 provides a large space for keeping static data where at least some instructions could be stored for later execution. According to some embodiments, such as some in-memory computing system embodiments, the RAM 915 can have sufficient storage capacity to store much of the data required for processing in the RAM 915 instead of in the storage 910. In some embodiments, the data required for processing may be stored in the RAM 915. The stored instructions may be further compiled to generate other representations of the instructions and dynamically stored in the RAM 915. The processor 905 reads instructions from the RAM 915 and performs actions as instructed. According to one embodiment, the computer system 900 further includes an output device 925 (e.g., a display) to provide at least some of the results of the execution as output including, but not limited to, visual information to users and an input device 930 to provide a user or another device with means for entering data and/or otherwise interact with the computer system 900. Each of these output devices 925 and input devices 930 could be joined by one or more additional peripherals to further expand the capabilities of the computer system 900. A network communicator 935 may be provided to connect the computer system 900 to a network 950 and in turn to other devices connected to the network 950 including other clients, servers, data stores, and interfaces, for instance. The modules of the computer system 900 are interconnected via a bus 945. Computer system 900 includes a data source interface 920 to access data source 960. The data source 960 can be accessed via one or more abstraction layers implemented in hardware or software. For example, the data source 960 may be accessed by network 950. In some embodiments, the data source 960 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope of the one or more embodiments, as those skilled in the relevant art will recognize. These modifications can be made in light of the above detailed description. Rather, the scope is to be determined by the following claims, which are to be interpreted in accordance with established doctrines of claim construction.

What is claimed is:

1. A method to generate vector matrixes for determining recommendations for objects and subjects, the method comprising:
    iteratively evaluating purchase data to determine mappings associating one or more objects from the objects with one or more subjects from the subjects;
    based on the determined mappings, generating an object vector matrix based on average measures over subject vectors included in an initial subject vector matrix;
    generating, by a processor, an updated subject vector matrix including updated subject vectors based on the generated object vector matrix and the purchase data;
    iteratively generating a set of consequent versions of the object vector matrix and a set of consequently generated versions of the updated subject vector matrix, wherein the iterative generation starts with the object vector matrix and the updated subject vector matrix as an input, and wherein generation of a consequent version of the object vector matrix from the set of consequent versions of the object vector matrix is based on a previously generated version of the subject vector matrix from the set;
    based on applying a validation criteria over the iteratively generated version of the object vector matrix and the versions of the subject vector matrix, defining a final object vector matrix and a final subject vector matrix to be provided for determining a recommendation for the objects and the subjects;
    computing vector distance measures between a first object vector and a set of other object vectors at the final object vector matrix, wherein a first object associated with the first object vector is associated with a mapping to a first subject;
    comparing the computed distances to determine a result object vector from the set of other object vectors to be a closest object vector, when a distance between the result object vector and the first object vector is lowest from the vector distances; and
    providing an identification of a result object associated with the result object vector as the recommendation, the recommendation being provided to one or more mapped subjects to the result object in the determined mappings.

2. The method of claim 1, further comprising:
    generating the initial subject vector matrix including reduced data at the subject vectors correspondingly identifying the subjects.

3. The method of claim 2, wherein the reduced data is generated based on applying a reduction algorithm over initial subject data defined at an initial user space.

4. The method of claim 2, wherein the updated subject vector matrix and the object vector matrix are defined in a decreased dimensionality space compared to an initial user space defined for the reduced data at the initial subject vector matrix.

5. The method of claim 1, wherein an updated subject vector from the subject vector matrix corresponds to a subject and is computed as an average of one or more object vectors from the object vector matrix, wherein the one or more object vectors are associated with one or more objects that are determined in mappings related to the subject.

6. The method of claim 2, wherein generating the object vector matrix further comprises:
    computing an average measure over one or more subject vectors from the reduced data associated with an object, wherein the one or more subject vectors are associated with subjects mapped to the object; and
    defining an object vector at the object vector matrix associated with the object based on the computed average measure.

7. The method of claim 1, wherein determining the final object vector matrix and the final subject vector matrix, further comprises:

17 determining a delta change between consecutive iteratively defined versions of the subject vector matrix and consecutive iteratively defined versions of the object vector matrix.

8. The method of claim 7, further comprising:
evaluating the delta change in relation to a threshold value defined at the validation criteria.

9. The method of claim 1, wherein the reduced data includes a reduced dimensionality of features of each subject from the subjects without reducing a dimensionality of a number of the subjects.

10. The method of claim 1, further comprising:
providing the recommendation for an object of the objects to a subject from the subjects based on the final object vector matrix and the final subject vector matrix, wherein the recommendation is provided to an online shopping platform running at a server system.

11. A computer system to generate vector matrixes for determining recommendations for objects and subjects, the system comprising:
a processor; and
a memory in association with the processor storing instructions related to:
iteratively evaluating purchase data to determine mappings associating one or more objects from the objects with one or more subjects from the subjects;
based on the determined mappings, generating an object vector matrix based on average measures over subject vectors included in an initial subject vector matrix;
generating an updated subject vector matrix including updated subject vectors based on the generated object vector matrix and the purchase data;
iteratively generating a set of consequent versions of the object vector matrix and a set of consequently generated versions of the updated subject vector matrix, wherein the iterative generation starts with the object vector matrix and the updated subject vector matrix as an input, and wherein generation of a consequent version of the object vector matrix from the set of consequent versions of the object vector matrix is based on a previously generated version of the subject vector matrix from the set;
based on applying a validation criteria over the iteratively generated version of the object vector matrix and the versions of the subject vector matrix, defining a final object vector matrix and a final subject vector matrix to be provided for determining a recommendation for the objects and the subjects;
computing vector distance measures between a first object vector and a set of other object vectors at the final object vector matrix, wherein a first object associated with the first object vector is associated with a mapping to a first subject;
comparing the computed distances to determine a result object vector from the set of other object vectors to be a closest object vector, when a distance between the result object vector and the first object vector is lowest from the vector distances; and
providing an identification of a result object associated with the result object vector as the recommendation, the recommendation being provided to one or more mapped subjects to the result object in the determined mappings.

12. The system of claim 11, wherein defining the final object vector matrix and the final subject vector matrix further comprises instructions related to:

18 determining a delta change between consecutive iteratively defined versions of the subject vector matrix and consecutive iteratively defined versions of the object vector matrix; and
evaluating the delta change in relation to a threshold value defined at the validation criteria.

13. The system of claim 11, further comprising instructions to:
generate the initial subject vector matrix including reduced data at the subject vectors correspondingly identifying the subjects,
wherein the reduced data is generated based on applying a reduction algorithm over initial subject data defined at an initial user space,
wherein the updated subject vector matrix and the object vector matrix are defined in a decreased dimensionality space compared to an initial user space defined for the reduced data at the initial subject vector matrix.

14. The system of claim 13, wherein the instructions related to generating the object vector matrix further comprise instructions to:
compute an average measure over one or more subject vectors from the reduced data associated with an object, wherein the one or more subject vectors are associated with subjects mapped to the object; and
define an object vector at the object vector matrix associated with the object based on the computed average measure.

15. The system of claim 13, wherein the reduced data includes a reduced dimensionality of features of each subject from the subjects without reducing a dimensionality of a number of the subjects.

16. A non-transitory computer-readable medium storing instructions, which when executed cause a computer system to:
analyze purchase data to determine mappings associating one or more objects from the objects with one or more subjects from the subjects;
based on the determined mappings, generate an object vector matrix based on average measures over subject vectors included in an initial subject vector matrix;
generate an updated subject vector matrix including updated subject vectors based on the generated object vector matrix and the purchase data;
iteratively generate a set of consequent versions of the object vector matrix and a set of consequently generated versions of the updated subject vector matrix, wherein the iterative generation starts with the object vector matrix and the updated subject vector matrix as an input, and wherein generation of a consequent version of the object vector matrix from the set of consequent versions of the object vector matrix is based on a previously generated version of the subject vector matrix from the set; and
based on applying a validation criteria over the iteratively generated version of the object vector matrix and the versions of the subject vector matrix, define a final object vector matrix and a final subject vector matrix to be provided for determining a recommendation for the objects and the subjects;
compute vector distance measures between a first object vector and a set of other object vectors at the final object vector matrix, wherein a first object associated with the first object vector is associated with a mapping to a first subject;
compare the computed distances to determine a result object vector from the set of other object vectors to be a closest object vector, when a distance between the result object vector and the first object vector is lowest from the vector distances; and provide an identification of a result object associated with the result object vector as the recommendation, the recommendation being provided to one or more mapped subjects to the result object in the determined mappings.

17. The computer-readable medium of claim 16, wherein defining the final object vector matrix and the final subject vector matrix further comprises instructions related to:

determining a delta change between consecutive iteratively defined versions of the subject vector matrix and consecutive iteratively defined versions of the object vector matrix; and evaluating the delta change in relation to a threshold value defined at the validation criteria.

18. The computer-readable medium of claim 16, wherein the instructions related to generating the object vector matrix further comprise instructions to:

compute an average measure over one or more subject vectors from the initial subject vector matrix associated with an object, wherein the one or more subject vectors are associated with subjects mapped to the object, and wherein the initial subject vector matrix includes reduced data at the one or more subject vectors correspondingly identifying the subjects; and define an object vector at the object vector matrix associated with the object based on the computed average measure.

19. The computer-readable medium of claim 18, wherein the reduced data includes a reduced dimensionality of features of each subject from the subjects without reducing a dimensionality of a number of the subjects.

* * * * *